(12) United States Patent
Marshall

(10) Patent No.: US 6,327,291 B1
(45) Date of Patent: *Dec. 4, 2001

(54) FIBER STUB END-PUMPED LASER

(75) Inventor: Larry R. Marshall, Sunnyvale, CA (US)

(73) Assignee: Iridex Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/440,039

(22) Filed: Nov. 12, 1999

Related U.S. Application Data

(63) Continuation of application No. 08/983,310, filed as application No. PCT/US96/18730 on Nov. 22, 1996, now Pat. No. 5,999,554, which is a continuation of application No. 08/562,297, filed on Nov. 22, 1995, now Pat. No. 5,663,979.

(51) Int. Cl.[7] .................................................. H01S 3/091
(52) U.S. Cl. ............................................. 372/75; 372/71
(58) Field of Search ................................................ 372/103

(56) References Cited

U.S. PATENT DOCUMENTS

| | | | | |
|---|---|---|---|---|
| 4,763,975 | * | 8/1988 | Scifres | 350/96.15 |
| 5,022,043 | * | 6/1991 | Jacobs | 372/95 |
| 5,511,085 | * | 4/1996 | Marshall | 372/22 |
| 5,663,979 | * | 9/1997 | Marshall | 372/103 |
| 5,907,570 | * | 5/1999 | Nighan | 372/41 |
| 5,982,789 | * | 11/1999 | Marshall | 372/22 |
| 6,090,102 | * | 7/2000 | Telfai | 606/10 |

* cited by examiner

Primary Examiner—Teresa M. Arroyo
Assistant Examiner—Gioacchino Inzirillo
(74) Attorney, Agent, or Firm—Wilson Sonsini Goodrich & Rosati

(57) ABSTRACT

A laser diode package couples laser diode outputs into a plurality of fibers, and these are bundled and brought to an output face that produces a divergent composite beam from the fiber ends. The beam end pumps a solid-state laser across a gap, and the divergence allows a wide tolerance in alignment of the pump and crystal. Preferably, one cavity mirror is a focusing mirror that reconcentrates residual pump light in the desired mode. In a preferred embodiment, the output face of the package is at a short stub or ferrule that provides a simple and effective pump beam centering alignment. The solid-state laser may be a rod or crystal and is preferably sufficiently short, in relation to pump beam diameter and divergence in the rod, that the pump beam within the rod lies in the $TEM_{oo}$ mode volume of the laser cavity. A concave mirror then refocuses residual pump light back into that mode. The rod preferably has a high index at the pump wavelength, but need not have high absorption. A common mounting plate and heat sinking arrangement are provided for the package and crystal, and the assembly is relatively insensitive to alignment variations, with only one cavity mirror requiring optical alignment. The bundle packing may take various shapes to match modes of a sheet or rectangular lasing medium.

19 Claims, 8 Drawing Sheets

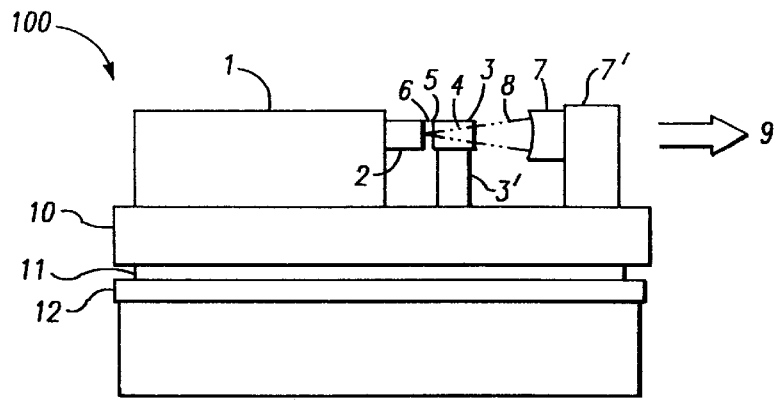
FIG.-1
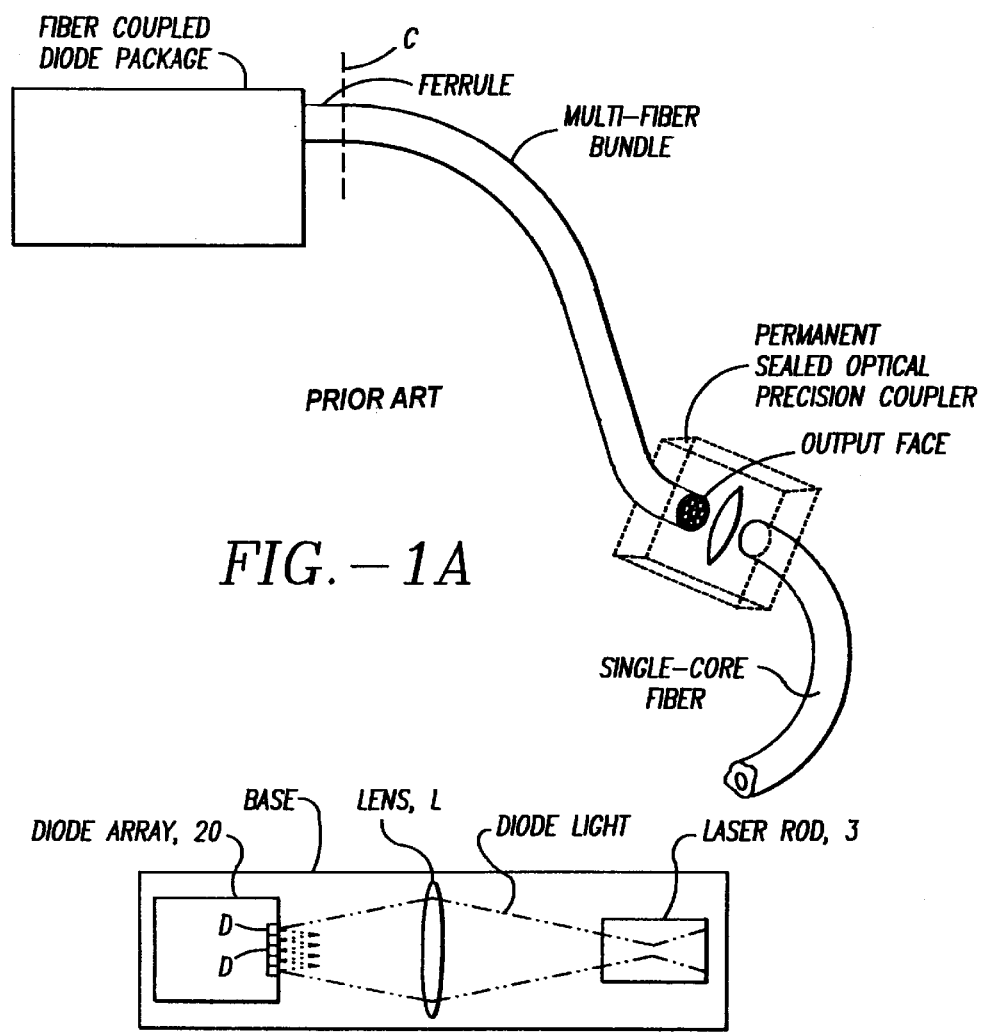
FIG.-1A
FIG.-2

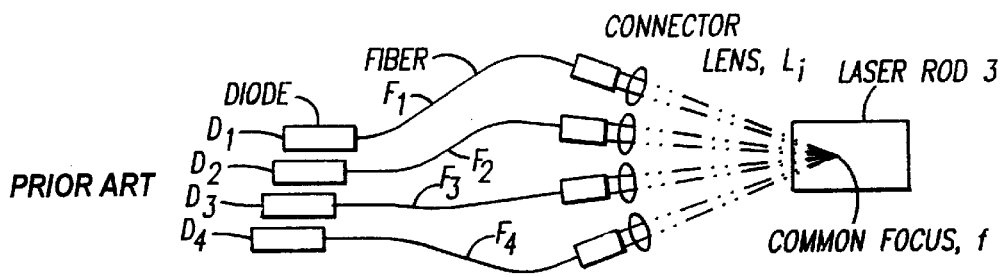
FIG.—3 PRIOR ART
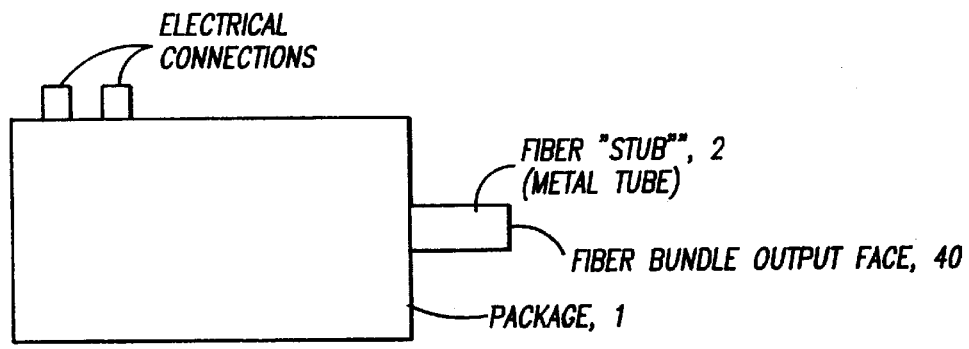
FIG.—4
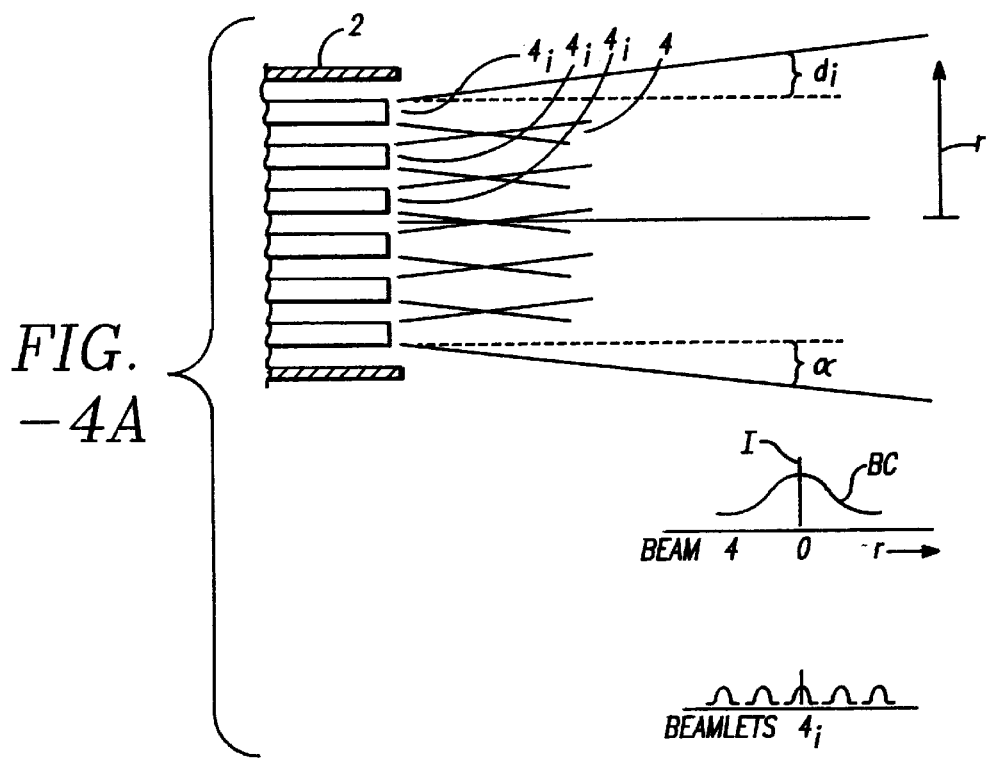
FIG.—4A

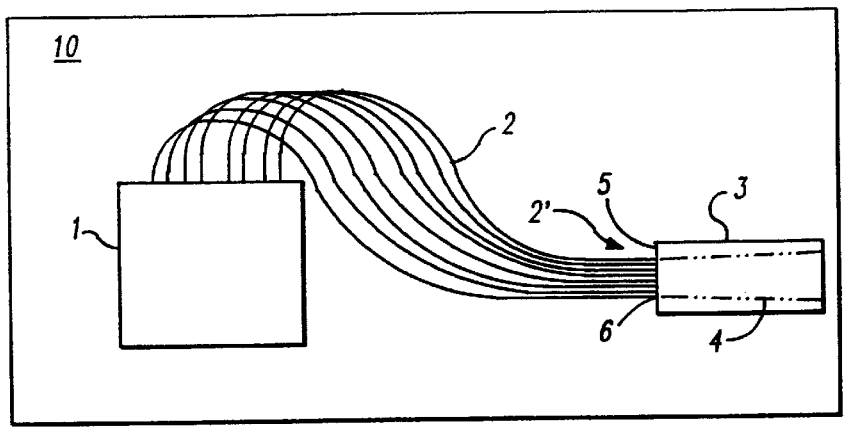
FIG.—10
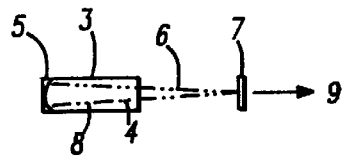
FIG.—11
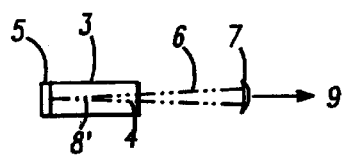
FIG.—12
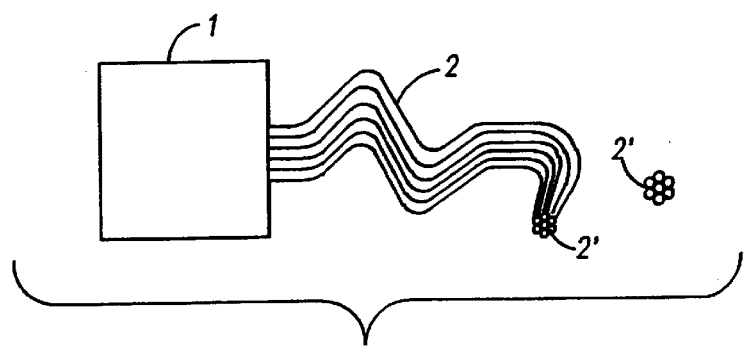
FIG.—13

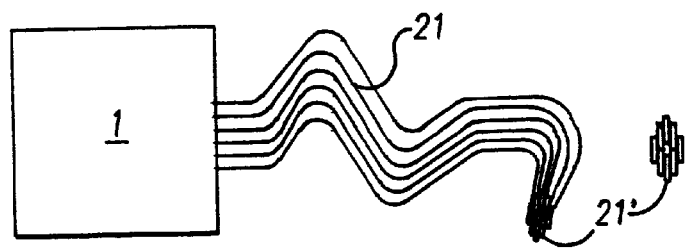
FIG.—14
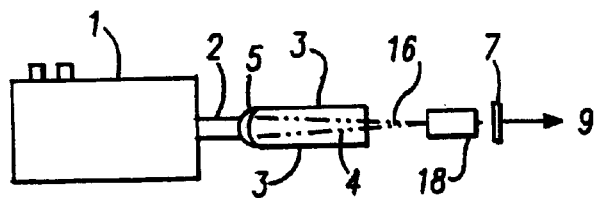
FIG.—15
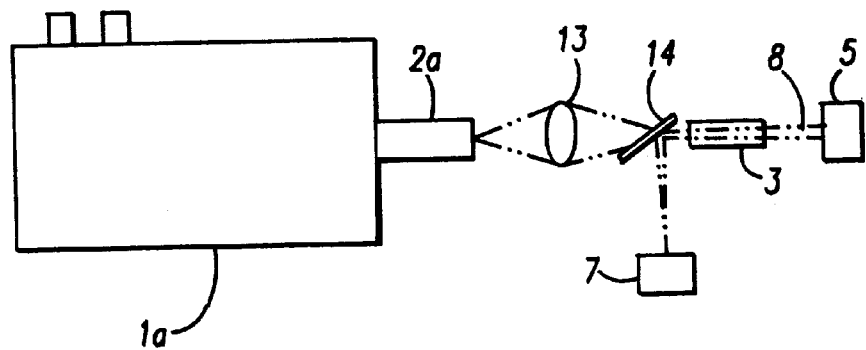
FIG.—16

FIBER STUB END-PUMPED LASER

RELATIONSHIP TO COPENDING APPLICATIONS

This application is a continuation of application Ser. No. 08/983,310, Jan. 7, 1998, now U.S. Pat. No. 5,999,554, which is a U.S. National Stage filing of International Application No. PCT/US96/18730, filed Nov. 22, 1996, which is a continuation application Ser. No. 08/562,297, filed Nov. 22, 1995, now U.S. Pat. No. 5,663,979, each of which is incorporated herein by reference in its entirety.

BACKGROUND OF THE INVENTION

The present invention relates to end-pumped solid-state lasers, and more particularly, to lasers which are pumped by one or more semiconductor laser diodes. In general, such systems have required a fair degree of ingenuity or purposeful design to inject the laser diode output light into the solid-state rod or crystal in a manner to obtain a useful output. Generally, for end-pumped lasers, this has meant selecting optics that match the pump light to the $TEM_{oo}$ crystal mode, or entailed using crystals of very high absorbance to limit the region in which pump light is concentrated; it has further required a number of elements to be precisely adjusted and aligned to achieve effective operation.

Descriptions in patents tend to be written at an early stage of the development of a technology, and may not accurately reflect either the technology, or the true scope of results achieved by the techniques sought to be patented. However, a brief review of patents in this area offers some insight as to constructions which the patentees believe to be promising or useful for effecting laser pumping systems of this type.

U.S. Pat. No. 3,982,201 of Rosenkrantz claims an end-pumped solid-state laser using an array of pump light emitting semiconductor diode lasers arranged to direct their light onto an end of the solid-state laser. It suggests that the laser diode array could be pulsed at such a rate as to induce continuous wave (CW) operation of the solid-state laser. The array is a physical configuration such that diode light enters the Nd:YAG laser crystal through an end face.

U.S. Pat. No. 4,847,851 of Dixon claims end pumping a solid-state laser by "butt-coupling" a laser diode to one end of the rod and using a "very short absorption length ... less than 500 micrometers" so as to absorb all of the diode pump light within the $TEM_{oo}$ mode volume. It further has a rear laser mirror coated directly onto a face of the diode.

U.S. Pat. No. 4,710,940 of Sipes claims a configuration in which an array of laser diodes are positioned to pump the laser medium in the direction of the axis, and requires a means for concentrating diode light inside the lasing volume. This is illustrated as a series of lenses which tailor the light from diode array to provide a focused spot inside the laser rod that overlaps the $TEM_{oo}$ mode volume of the laser.

U.S. Pat. No. 4,653,056 of Baer, et al., claims a laser diode array secured in a housing behind and in optical alignment with a laser rod. The preferred construction of this device also uses a series of lenses to provide focused spots inside the laser rod in the mode volume.

In summary, these prior art and pumping technologies have been restricted to laser diode arrays mounted in optical alignment to the laser rod, within a laser head. Generally, the diode array is a linear array with astigmatic properties and may require fairly sophisticated optical arrangements to bring its output into a symmetrical, semi-circular output suitable for end pumping (see for example, the papers of Zhou, et al. (1985), Berger, et al., (1988), and Oka and Kubota (1988)).

In addition to these constructions, various researchers have suggested using one or more optical fibers to couple pump light to a laser.

Recently, a new type of laser diode source has emerged which produces a large output at a single aperture by coupling many single diodes through separate optical fibers which are then bundled together to form a single, circular emission aperture. The entire assembly is a self-contained package with a short metal ferrule protruding from one side; the ferrule collects the individual fibers into a bundle of circular cross-section. This bundle is coupled via a permanently bonded interface into an SMA connector which couples the output light into a single-core fiber. This homogenizes the diode outputs, and produces an output of Gaussian circular intensity profile at the fiber output. This output is well matched for end-pumping the $TEM_{oo}$ mode of a crystal. since that mode also has a Gaussian intensity profile. At present, this type of multi-fiber-coupled and single-fiber-output high power CW diode array is available from two commercial suppliers, SDL, Inc., and Opto Power Corp. Typical output powers of these devices approach or exceed six watts. Because of this high output power, one would expect these diode packages to be useful as pump lasers for various laser media. Indeed, Baer, et al., in U.S. Pat. No. 4,723,257 have previously suggested using a fiber-coupled, laser-diode source to power a remote laser head, since this would allow the head to be entirely free of electronics and, thus, to have a relatively simple and robust architecture. The fiber output of these current laser diode arrays would appear to be amenable to positioning and focusing so as to implement at least some of the particular pumping configurations described in one or more of the above patents. However, as a trade-off for the ease of handling obtained by having a diode source with fibers already attached and bundled, one must settle for a permanently attached and aligned high-power single fiber jumper. One might expect that highly specialized optics, for example, relatively large aperture long focal length optics, would be required to match the output to an end-pumped crystal. Moreover, the pumping qualities of such a strong source with its beam derived of multiple small fiber output beams are not fully explored.

SUMMARY OF THE INVENTION

In accordance with the present invention, a laser diode source is fabricated to terminate in a short stub bundle, and the output of this stub is butt-coupled directly to a crystal to pump the solid-state laser. Such a stub-output device may be achieved by cutting away the sealant/interface from the junction of the stub and the single-core fiber coupler of a commercial diode package device, and removing the single-core fiber. The remaining stub has a simple and uniform packing of fibers that individually produce small, divergent outputs, and no separate optics provided to shape the pump output beam. Applicant has found quite unexpectedly, that by pumping a laser medium with this dispersed source having neither a fiber jumper nor a coupling lens, the solid-state laser is more efficiently excited: both the output power and the beam quality are increased.

In a preferred embodiment, the ferrule defines an axially-directed bundle of fibers each having an end. The ends are positioned spaced across an air gap from the solid-state crystal, and they emit a beam which diverges in the air gap and, after entering the crystal, still diverges, although generally at a lesser rate in the crystal. Thus, the beam intensity decreases as it propagates through the crystal, in addition to the attenuation which occurs due to absorption. When used for generating $TEM_{oo}$ mode laser radiation, this pump beam distribution renders the system relatively immune to tilt and misalignment of the pump laser so that a relatively coarse alignment suffices to achieve effective operation. Concentricity is easily obtained due to the cylindrical stub mounting. Furthermore, the solid-state crystal may be so short in relation to pump divergence and the crystal attenuation depth that the pump beam passes out of the distal face of the crystal before it has diverged outside the $TEM_{oo}$ mode volume.

Preferably, the laser diode, the crystal, and any intracavity elements such as doublers, modulators or switches are all mounted on a common sink or temperature control device. A first mirror is coated on one end of the laser crystal through which the pump beam enters. A distal mirror is spaced from the other end and acts to define the lasing cavity. The distal mirror is preferably concave, to refocus the diverged beam back within a small mode volume of the crystal. This architecture is also amenable to a passive stabilization construction as described in applicant's co-pending U.S. patent application Ser. No. 08/300,137.

Advantageously, applicant has found that by end-pumping a crystal with a distributed array of divergent beamlets one avoids the high degree of stress, optical and physical distortion, for example, thermal lensing, that occur when focusing a single-fiber beam of comparable power, and which has heretofore frustrated attempts to maintain $TEM_{oo}$ operation with a laser diode pump at such powers.

BRIEF DESCRIPTION OF THE DRAWINGS

These and other features of the invention will be understood from the description below taken in conjunction with illustrative drawings, wherein:

FIG. 1A shows a prior art packaged laser diode array with fiber bundle output;

FIG. 1 shows a side view of one embodiment of the present invention;

FIG. 2 shows a typical end-pumping configuration of the prior art;

FIG. 3 shows another prior art configuration for end pumping a Nd:YAG laser rod;

FIG. 4 shows a packaged laser diode array with fiber bundle stub output;

FIG. 4A illustrates beam shape and intensity of the array of FIG. 4;

FIG. 10 illustrates another embodiment pumped by butt-coupled fibers;

FIG. 11 illustrates a laser cavity for expanding laser mode in a pump input region;

FIG. 12 shows an embodiment with cavity mode expanded at its output coupler end and matched to divergent diode pump light;

FIG. 13 illustrates a pumping scheme with fiber ends arranged for a desired laser mode shape;

FIG. 14 illustrates a pumping arrangement with non-circular fibers to enhance packing and provide a mode matched beam shape;

FIG. 15 illustrates an embodiment with intracavity frequency doubling;

FIG. 16 illustrates an embodiment with a relay lens;

DETAILED DESCRIPTION

Figure 5:
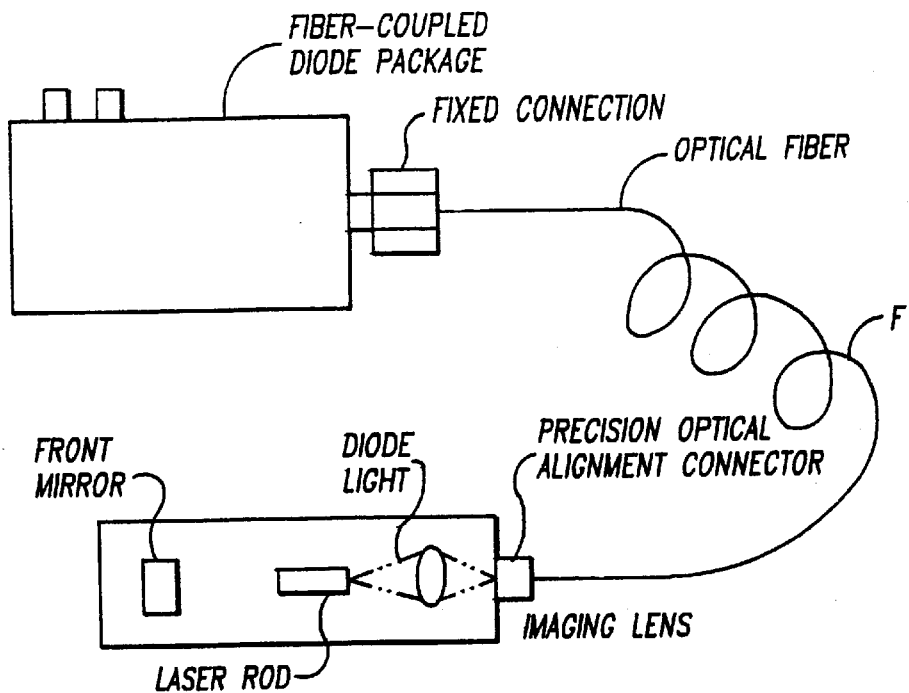
FIG. 5 shows a prior art end-pumped laser using a fiber-coupled diode source.

FIG. 1A illustrates a commercially-available laser diode package in which a plurality of laser diodes are mounted with requisite circuitry or controls enclosed within a box to form a standard P5 or P6 assembly in which each laser diode is coupled to an output fiber and the output fibers are bundled together. The output fibers pass through a ferrule as a pigged-tailed fiber bundle that extends outwardly from the box and is coupled to a single large core fiber extension to provide an output face which may be positioned relatively conveniently to suit a desired application. The bundle consists of a great number of fibers, each one of which carries a relatively small amount of power; however, collectively the bundle provides up to about ten watts of output power. The collected bundle has an aperture between approximately one-quarter and three millimeters. The ferrule serves the dual purposes of gathering the fibers into a sheaf and reinforcing the fibers at the otherwise mechanically vulnerable transition region between the inside of the package and the flexible, unsupported length of fiber externally of the package. So far as relevant hereto, applicant employs such a laser diode package as a pump source for the systems described further below, and the commercially-available diode package is modified with the external fiber bundle severed or reduced in length, so that the fibers attached to the individual laser diodes extend only to the cut line C at the output end of the ferrule rather than coupling into a jumper fiber. Applicant refers to the laser diode package so modified in construction as a stub-output package. In this construction, each fiber has an emission face at the end of the ferrule so that light is emitted directly outward from each fiber at that position and the fiber outputs merge into a beam of large cross-section and relatively uniform intensity distribution.

FIG. 1 shows a diode end-pumped solid-state laser 100 in accordance with the present invention. System 100 includes a laser diode package 1 such as an SDL, Inc. P5 or P6 package, in which the diode outputs are brought to an output aperture through a metal stub 2 fixed to the side of the package. The stub 2 is placed in immediate proximity, across a small air gap 6, to a back mirror 5 which is formed on the end of a laser crystal 3. By way of example, stub 2 may have a clear aperture of approximately 500 micrometers, and the gap 6 is typically less than one mm and, preferably as small as possible without actual contact between the output face of stub 2, and the end face 5 of crystal 3. The gap 6 allows for thermal expansion without damage or misalignment of elements. Spaced across from the other end of the crystal 3 is a front mirror 7 supported in a mounting and alignment mechanism 7', such that the mirror 7 and the face 5 define a lasing cavity about the crystal. The pump light 4 emitted from the stub enters the crystal through the back mirror 5 which transmits at the pump wavelength but is highly reflective at the lasing wavelength of the crystal. The front mirror 7 is reflective at the pump wavelength and is transmissive at the crystal laser wavelength such that laser light 8 excited in the crystal by the pump, is coupled therethrough as an output beam 9. The laser crystal 3 is supported in a mount 3' which also provides heat sinking for the crystal. Both the diode array 1 and the crystal 3 are mounted and heat-sunk to a common base plate 10 which in turn is temperature controlled by a thermoelectric or similar cooler assembly 11. A heat sink 12 carries heat from the cooler 11 and may in turn be actively cooled, for example, by a fan or by a channeled flow of coolant. As shown in the FIGURE, the pump illumination 4 forms a diverging beam which increases in diameter from its relatively concentrated point of entry at crystal face 5 to a more diffuse and spreading beam as it exits the crystal at its opposite end. Mirror 7, on the other hand, is a concave mirror which reconcentrates the pump light reflected back toward the crystal so that the returned pump beam attains a relatively high intensity about a focal region through which it had previously passed and which is axially centered in the crystal.

Figure 9:
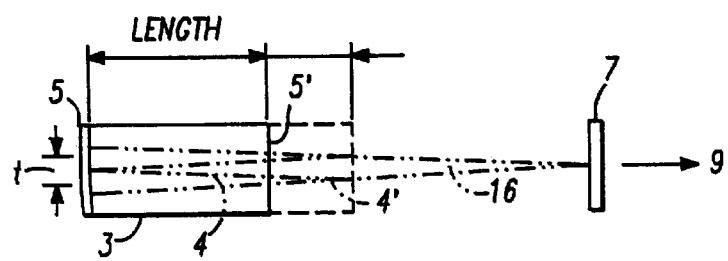
FIG. 9 illustrates mode shape and rod length in a preferred embodiment.

Skipping ahead briefly to FIG. 9, there is shown a detailed view of the pump beam 4 in relation to a preferred geometry of a pumped system with a laser crystal 3. As shown, beam 4 enters crystal 3 at face 5 as a small diameter but diverging beam directed substantially along the axis of the crystal. The diameter t of the $TEM_{oo}$ mode of the laser cavity within the crystal is indicated at the left side of the figure, and the distal end of the crystal 5' is shown at the right. In this embodiment, the crystal is selected sufficiently short so that face 5' intersects the pump beam 4 when the beam has not diverged substantially, and is no broader than t. Thus, rather than being absorbed in the crystal, pump energy outside of the desired mode passes out of the crystal 3 as a residual expanding pump beam 4'. This light, in turn, is reflected back into the crystal by the front mirror 7. Also shown in FIG. 9 is the laser output 16 of crystal 3. This beam emanating from within the stimulated region of the crystal is a narrow beam of high quality. As noted above, the distal front mirror 7 is preferably a focusing mirror which redirects all of the residual pump light 4' back into the central mode volume in the crystal 3. By tailoring the crystal length to the divergence of the pump beam, in this manner, optimal use is made of the available pump energy.

Before describing other advantages of the invention and additional embodiments thereof, a brief review of typical prior art end-pumped constructions is in order. FIG. 2 illustrates a typical fiberless construction wherein an array 20 of diodes D have their outputs coupled by a lens L into a laser rod 3. FIG. 3 shows a variation wherein each diode $D_i$ presents its output via a fiber $F_i$ to a single lens $L_i$ and the fiber/lens arrangements are aligned with precision couplers and aimed into a common focal region f in the laser crystal. FIG. 5 shows a packaged laser diode assembly of the prior art arranged such that the output from an optical fiber F is coupled via an imaging lens into a solid laser rod.

FIG. 4 shows a packaged laser diode assembly 1 as modified for the present invention, wherein fibers lead the diode outputs to a common output face 40 located in a stub or projecting metal tube 2. This assembly is similar to the commercial device of FIG. 1A, but instead of having a permanently attached output fiber bundle, fibers are employed only to reach an output face at the rigid and mechanically-fixed stub 2 projecting from the package casing. This construction has been found by applicant to provide a surprisingly efficacious solid-state pumping arrangement with enhanced properties as described herein.

FIG. 4A illustrates the output beam 4 formed by the stub end 2 of the laser diode package shown in FIG. 4. Each fiber produces a beamlet $4_i$ which is a divergent beam with a half-angle at $\alpha$ that depends on fiber size and is typically 5–30°, and a generally Gaussian profile. The beamlets $4_i$ add together in a central region, and produce an overall beam profile which is generally broad and uniform, with a relatively small amount of energy diverging from the beam sides at edges $d_i$ in the near field.

Figure 6:
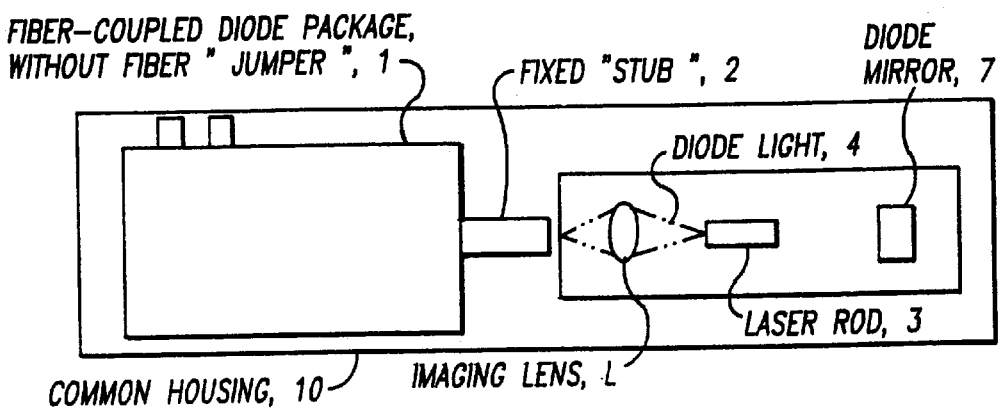
FIG. 6 shows the diode array of FIG. 4 optically coupled to a rod.

FIG. 6 shows a system in accordance with applicant's invention utilizing the package 1 of FIG. 4. This is a modified laser diode assembly having a stub output, which is relatively directly coupled into a rod. In this case, the laser diode assembly and the laser rod are positioned on a common housing 10 and, preferably also a common heat-sinking arrangement. Furthermore, the cylindrical stub ending is aligned in a straightforward way, within broad mechanical tolerances, to the laser rod itself and a simple relay lens L images the divergent bundle 4 of beamlets from the diode output onto the face of the laser rod, and thus allows greater flexibility in placement of mirrors and intracavity optical elements.

Figure 7:
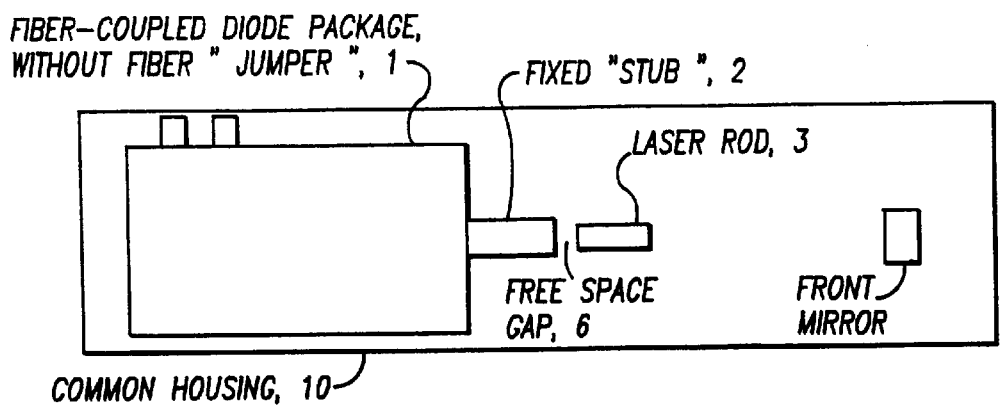
FIG. 7 is a schematic top view of the embodiment of FIG. 1.
Figure 8:
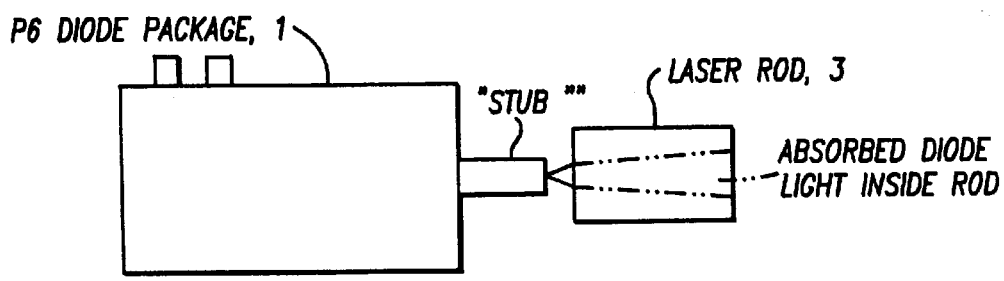
FIG. 8 illustrates beam shape in the laser of FIGS. 1 and 7.

Returning now to the embodiment of FIG. 1, FIG. 7 shows a top view of the preferred embodiment of the invention of FIG. 1, wherein the relay lens L (FIG. 6) is absent and the diode package 1 is coupled directly through a small fee space or air gap 6 into the rod 3. In this case, the output beam 4 from the diode package diverges in the air gap, and after striking the laser rod 3 refracts to a slightly less divergent beam which, nonetheless, continues diverging within the laser crystal as shown in the detailed drawing, FIG. 8. The rod and stub may be connected in mutual alignment simply by mechanical alignment of bolt holes in base 10 which match through-holes of the laser package, without precision optical alignment. Because the pump output is divergent but centered, any slight angular misalignment has negligible effect on pumping efficiency and the region of highest intensity is automatically centered.

FIG. 10 depicts a related optical pumping scheme wherein the laser diode array 1 consists of a packaged array such as the aforesaid SDL, or the Opto Power CW diode arrays. In this embodiment, a plurality of optical fibers 2 are bundled into a hardy and maneuverable bundle in which the fibers terminate in a common output face 2'. The output face 2' is spaced across a small air gap 6 from the input face 5 of the crystal which, as in the first embodiment, is preferably transmissive at the pump wavelength and reflective at the lasing wavelength of the crystal. As with the stub embodiment of FIG. 1, this injects a divergent pump beam 4 into the crystal. The beam 4 has a minimal diameter approximately equal to that of the bundled output fibers and this diameter increases further away from the input face 5 of a crystal. As in the first embodiment, the laser diode assembly 1 and laser medium 3 are mounted in a common housing 10 which can also include a common heat sink or cooler 11,12 for maintaining these elements at a stable temperature. This construction may be used to form a laser oscillator, or may be used simply to amplify an injected laser beam.

As described above, the provision of a composite diode-generated pump beam made up of plural divergent fiber outputs results in the unusual situation of a divergent beam pumping a relatively small crystal, with the result that suitable precision or control of alignment would appear to be unattainable, or achievable only by employing a rather complex arrangement of beam conditioning and alignment elements. However, applicant has realized that by employing a laser medium which is relatively short as depicted, for example, in FIG. 9, or of relatively low absorbance, the lasing volume can be accurately controlled without requiring a series of precision alignment steps in setting up the laser and its cavity-defining components. Specifically, the crystal 3 can be effectively pumped even when the diode package 1 is held and aimed by hand in a roughly axial direction; only the cavity mirror 7 needs to be precisely positioned.

In general, one may expect to gain stability of alignment by forming at least one cavity-defining mirror directly on a face of the laser rod. The ideal embodiment of an end-pumped laser uses a back cavity mirror formed by polishing a surface on the pumped end of the laser rod, and coating a mirror directly onto this surface (see, for example, U.S. Pat. Nos. 4,710,940 and 4,653,056). The inventor has found that when such a laser is end-pumped by a single-core optical fiber at high power, e.g., above six watts, a strong aberration occurs in the laser medium from thermal lensing together with a distortion of the pumped face. Basically, the intense pump radiation at the center of the rod causes local heating and uneven distortion of the rod end, thereby distorting the back mirror of the laser cavity. This distortion is sufficiently non-spherical so as to be effectively un-correctable using standard optics, and it therefore effectively prevents the laser from lasing in a $TEM_{oo}$ mode. However, applicant has surprisingly found that when pumping is performed directly with the high power output stub of a P6 diode package as described above, this problem can be completely overcome. This essentially occurs because of the relative uniformity of light distribution; the intensity peaks are small, isolated from each other, and closely spaced where they occur in the near field, so that the induced heating and dimensional changes quickly become highly uniform. This may be understood with reference to FIGS. 4A and 19(a)–(d).

Figure 19:
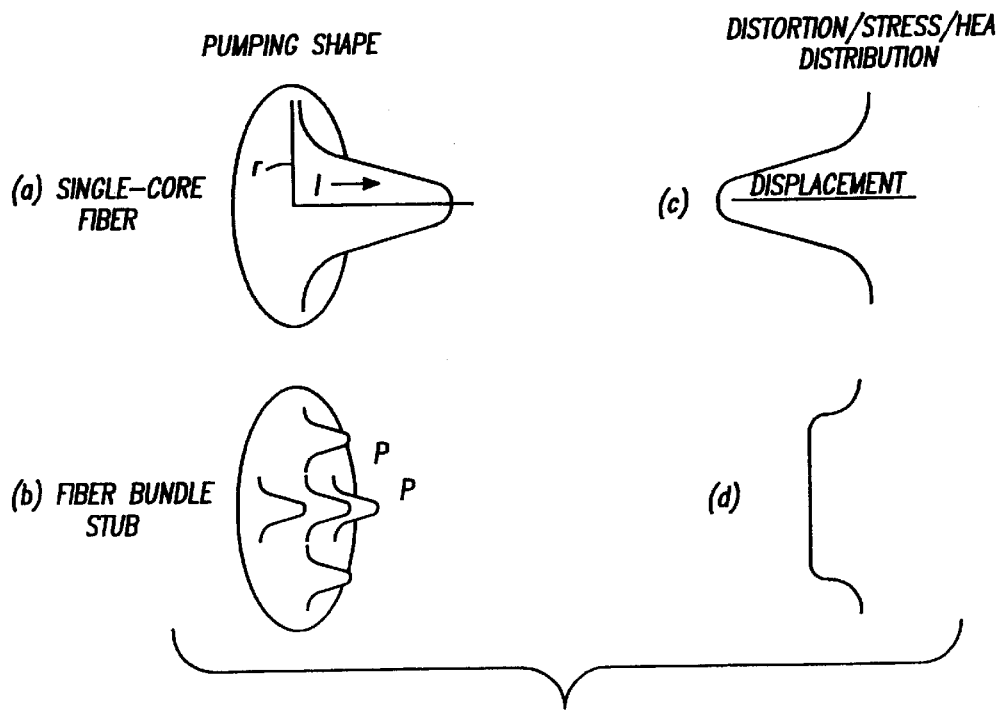
FIGS. 19(a)–(d) show beam intensity and thermal or stress distribution for the prior art and for the present invention.

FIG. 19(a) shows the pump light intensity I as a function of radial position in the crystal for a pump beam from a single core fiber. A region of high intensity is established on the axis. FIG. 19(b) shows the corresponding pattern for illumination by a multi-fiber bundle at a focus, or at region of highest intensity near the output face. The regions of maximum intensity have peaks p which are generally of lower power density than that of a single fiber beam of the same total power, and are closely spaced so that any induced heating in the crystal will be smoothed by heat conduction within the crystal, which quickly flattens gradients and equalizes thermal effects. Moreover, away form the input face or focal plane the continuing divergence of the multi-fiber beam allows a somewhat greater level of illumination and heating of the outer region of the crystal, eliminating the high levels of strain that occur when the crystal is heated only on the axis.

FIGS. 19(c) and 19(d) illustrate the corresponding distributions of heat and consequent distortion or strain. As shown, the high central inhomogeneity of high power single fiber illumination in (c) with its aspheric distortion of the medium, is replaced by the uniform distribution of (d) across the beam width of the pumped area. With such an arrangement, applicant has been able to extract about eighty percent of the multimode output of the end-pumped laser rod 3 in the $TEM_{oo}$ mode, even when using thirteen watts of pump power. This contrasts markedly with the heating instability and rapid degeneration that occur when pumping at full power with focused light from a single core fiber.

Returning now to a discussion of the pump arrangements with a divergent multi-fiber bundle, within a broad range of alignment possibilities, certain types of beam shaping may be used to efficiently convert the pump beam energy.

In the embodiment of FIG. 11, as in the preceding embodiments, the pump light 4 emitted from the fibers enters the laser rod through a back mirror 5 which is transmissive at the pump wavelength but highly reflective at the lasing wavelength. A front mirror 7 forms a closed optical cavity to allow lasing and output coupling of the laser light as an output beam 9. This embodiment differs from the preceding ones, however, in that back mirror 5 is a convex surface polished onto the end of the laser crystal, forming a concave mirror surface which focuses return passes of pump light so as to produce a laser mode 8 with a maximum diameter adjacent to the input end 5. In another embodiment, shown in FIG. 12, a flat input mirror produces a laser mode 8' with a minimum diameter at the input end 5. In this embodiment, the front mirror 7 is curved with a concavity to tailor the expansion of the cavity mode to that of the pump light 4 absorbed in the laser crystal 3. Thus, a great degree of control is available over the shape of the pump light within the laser crystal despite the nominally divergent nature of the end-emitting bundled fiber source.

To obtain better control of the laser mode, the output ends 2' of the fibers 2 may be arranged in a pattern to match the beam shape with a mode shape of the laser cavity, as shown in FIG. 13. In addition, the ends of the fibers can be rounded, or can be doped to provide a graded index, so that they provide some focusing of the diode pump light. Alternatively, a microlens array or a hologram equivalent to such an array can be mated to the fiber bundle end to focus or re-direct all outputs, e.g., at a common point.

It should be noted that the fibers employed to couple light from the diode facets within package 1 to the output at stub 2 or at the bundle end can be matched better to the diode facets if they are rectangular in aspect. Such a configuration is shown in FIG. 14, wherein the fibers 21 have rectangular cross-sections. In this case, the fibers may be packed in a shape closely matching the desired mode within the laser cavity as shown by the arrangement of fiber ends 21' in FIG. 14. As shown, the resultant output face is elliptical or elongated rather than circular.

In addition to the basic end-pumped laser constructions described above, in other systems additional elements may be incorporated in the laser cavity or lasing system to convert the fundamental laser light to another wavelength. FIG. 15 shows one such system, wherein a nonlinear crystal 18 is provided in the cavity between mirrors 5 and 7 for wavelength conversion of the laser light 16 before the output beam 9 is coupled out of the cavity. FIG. 16 shows yet another embodiment, wherein a relay lens 13 collects the multiple source diode output beam from the stub 2 and images the stub output plane onto an end of the laser crystal 3 with 1:1 image magnification. This embodiment allows the pump source to be physically separated from the end of the laser crystal so that, for example, a turning mirror 14 may be introduced, as illustrated. This use of a separate mirror, allowing the rod surfaces to be nonreflective, is further advantageous in that it allows other elements, such as Q switches to be placed in appropriate regions of the cavity for effecting desired laser control. In addition, in this embodiment, the physical distortion of the pump faces due to absorbing the pump light does not directly act on the cavity mirrors, so beam stability is improved with such a construction.

Figure 17:
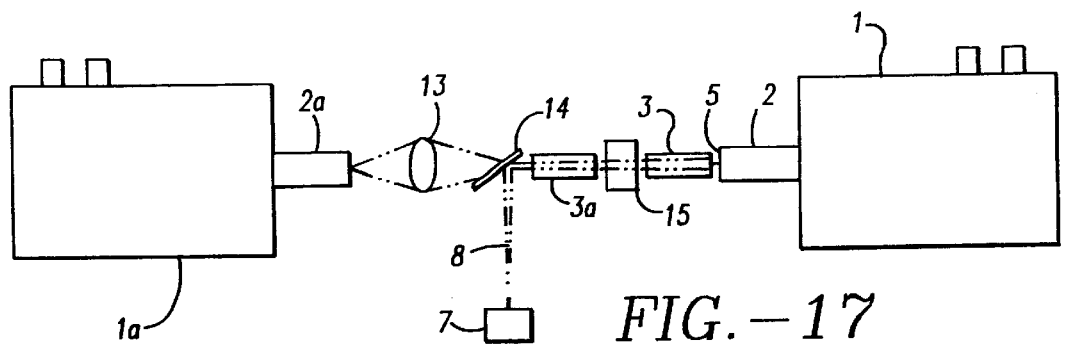
FIG. 17 illustrates an embodiment in which two solid-state rods are pumped by two laser diode packages.

FIG. 17 shows yet another embodiment of the invention, wherein output power of the laser system is increased by employing a second diode pump array 1a and introducing a second laser crystal 3a within the laser cavity. In this case, the laser cavity is folded by an optical element 14 which is highly reflecting at the lasing crystal wavelength and highly transmissive at the diode wavelength. The second laser crystal 3a has anti-reflection coatings at the laser wavelength on both faces, and the face pumped by diode 1a also has an anti-reflection coating at the pump wavelength. The diode output of assembly 1a is collected by a lens 13 and focused into laser crystal 3a through the dichroic mirror 14. This embodiment can be improved by placing an optically-active quartz rotator 15 between the two laser crystals 3 and 3a so as to impart a 90-degree phase shift between the laser beams passing through each rod. This rotator effectively cancels the thermally-induced birefringence in each rod with its mate. The laser output can then be polarized, either by using the polarizing sensitivity of the turning mirror 14, or by adding an additional polarizing element such as a Brewster plate or thin film polarizer.

Figure 18:
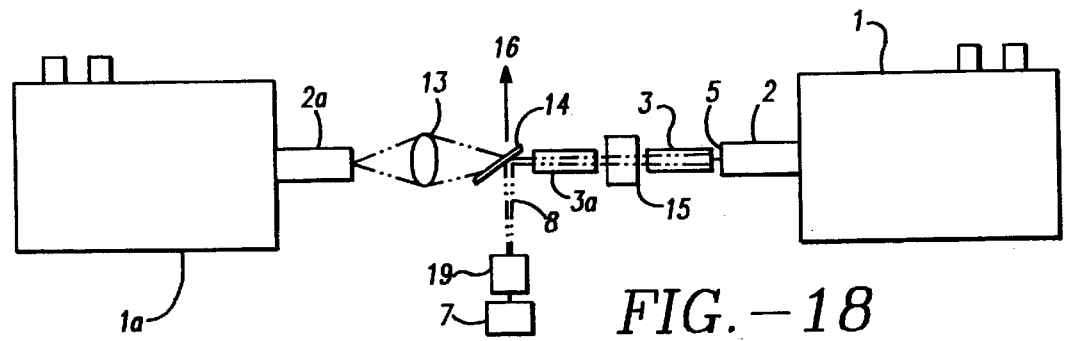
FIG. 18 illustrates the system of FIG. 17 with a nonlinear crystal positioned to achieve two-pass conversion with output via a folding mirror.

A nonlinear crystal can also be placed within the cavity of the two diode embodiment shown in FIG. 17. FIG. 18 shows such a nonlinear crystal 19 placed near the cavity-defining mirror 7. In this case, mirror 7 reflects both the fundamental wavelength of the laser and also the wavelength generated by the nonlinear crystal. Nonlinear optical conversion occurs in two passes through the crystal 19, and the wavelength-converted light exits the laser cavity through the dichroic mirror 14, which is transmissive at the nonlinearly-generated wavelength.

Figure 18A:
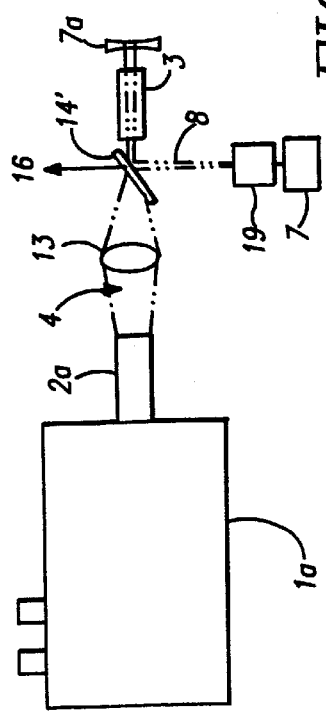
FIG. 18A shows a doubling embodiment with a single pump and crystal.

One especially advantageous construction is shown in FIG. 18A. In this embodiment a relay lens 13 images the divergent fiber bundle beam 4 through a 45° dichroic mirror 14' onto an un-mirrored end face of the crystal 3, and the cavity is defined between mirrors 7 and 7a. The crystal is preferably a material such as Nd:YVO$_4$ which lasers in a single polarization, so there are no losses off the turning mirror 14', and the crystal output light travels in two passes through the non linear doubling element 19, reflected by mirror 7, before passing out through mirror 14' as a doubled output beam 16. Since this construction has no mirrored crystal ends, the pump beam does not distort the end faces and degrade the doubled beam. This construction enhances brightness of the intracavity doubled lasers and their efficiency, while maintaining a compact size. As before, relay lens 13 allows spacing to insert elements such of the turning mirror 14', while effectively translating the divergent diode output bundle 4 to the crystal face.

Figure 20:
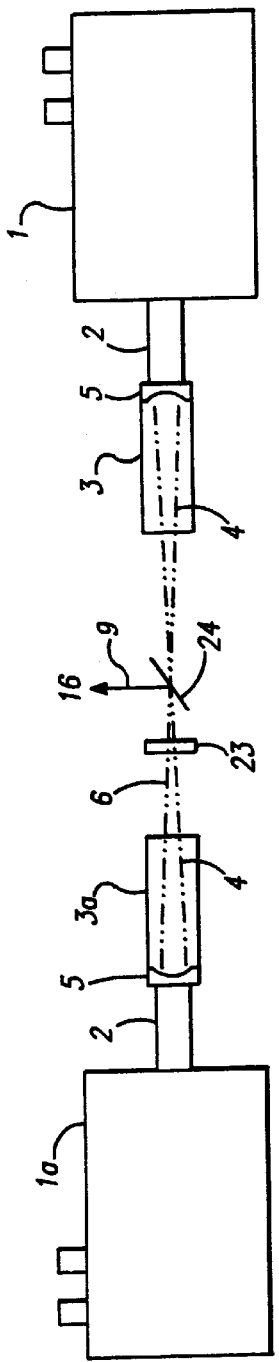
FIG. 20 shows another embodiment with two rods pumped by two laser diode packages.

FIG. 20 shows another embodiment in which first and second laser rods 3, 3a are pumped by first and second laser diode packages 1, 1a aimed inward in opposite directions. The rods have mirrored pump ends which define the lasing cavity, while a beam splitter 24 placed between the rods reflects a portion of the laser light to output beam 9. Optionally, a beam conditioning element 23 such as a wave plate may be inserted to control the amount of light coupled out of the cavity by the splitter 24.

Figure 21:
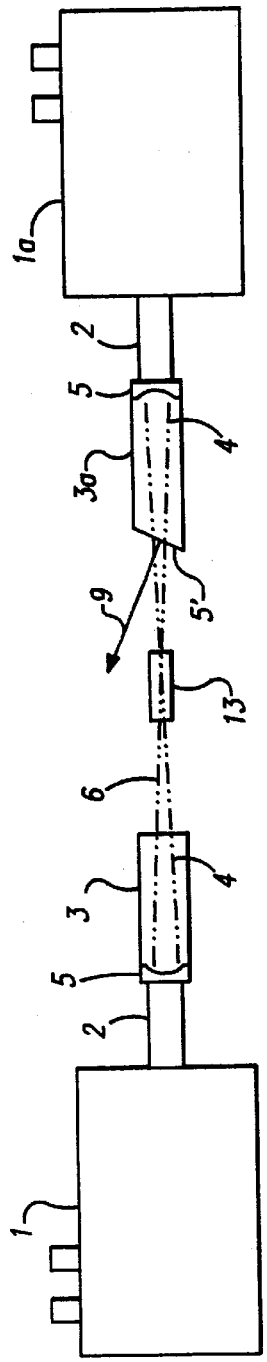
FIG. 21 shows yet another two rod, two laser diode package system embodiment.

FIG. 21 shows yet another embodiment which simultaneously solves the problem of providing high pump power levels while effectively coupling large amounts of laser power out of the cavity. In this embodiment, as in the system of FIG. 20, a pair of laser diode packages 1, 1a are butt-coupled to opposed ends of a laser cavity defined by a mirror surface on the back end 5 of each rod. In this system, however, a nonlinear element 13 such as a frequency doubling crystal is placed between the two rods to receive the laser light generated in the crystals, and an end face 5' of one rod is coated for reflection at the doubled frequency. Face 5' is angled slightly to reflect the doubled output obliquely out of the cavity.

Thus, butt coupling of a laser diode package to drive a crystal not only produces an unexpectedly effective pumping system but is amenable to diverse arrangements of system elements to increase the output power or provide additional laser frequencies and allow compact spatial layouts of the lasing and optical or support elements of the system.

The foregoing completes a description of basic laser systems embodying the present invention. It will be understood, however, that the invention is capable of being varied and modified to accommodate or be incorporated in diverse system architectures and improved constructions analogous to ones explored in the prior art, and that variations and modifications thereof will occur to those skilled in the art. All such variations and modifications are considered to lie within the scope of the invention, as set forth in the claims appended hereto.

What is claimed is:

1. An optically-pumped lasing system, comprising
   a lasing medium;
   a source of pumping radiation with a plurality of laser diodes which emit diode light and couple said diode light into a plurality of optical fibers, the optical fibers being bundled together and terminating at an output aperture to provide a pump output beam composed of a bundle of divergent beamlets,
   a relay lens positioned to collect diode light emitted from the aperture and direct the diode light onto an end of the lasing medium;
   a housing supporting both said medium and said relay lens; and
   wherein said aperture is positioned substantially adjacent or conjugate to an end of the lasing medium so that the pump output beam is directed as a bundle of divergent beamlets into the lasing medium to illuminate a distributed area of an end of the lasing medium and pump the laser medium with reduced thermal stress.

2. The optically-pumped lasing system of claim 1, wherein said fibers are bundled into a shape matching that of a desired mode within the lasing medium, and the pumping light is transferred through free space into the lasing medium without changing beam shape by imaging or coupling optics.

3. The optically-pumped lasing system of claim 1, wherein the pump source is operated to produce one of pulse and continuous wave pumping light, and the medium amplifies the pump light.

4. The optically-pumped lasing system of claim 1, in which the medium is a laser oscillator, surrounded by a front and a back mirror, which provide a laser cavity having optical feedback of radiation to thereby produce a laser output beam.

5. The optically-pumped lasing system of claim 1, further comprising means for pulsing the output of the source of pumping radiation, so that the lasing medium has a pulsed output.

6. The optically-pumped lasing system of claim 1, wherein the plurality of fibers are butt-coupled to an end of the lasing medium.

7. The optically-pumped lasing system of claim 1, wherein the bundle of divergent beamlets are directed through a free space gap of less than one millimeter into the end of the lasing medium.

8. The optically-pumped lasing system of claim 1, wherein the pump output beam is directed by a relay lens to a conjugate position at which the bundle of diverging beamlets enter the lasing medium.

9. The optically-pumped lasing system of claim 1, wherein said aperture is a fiber bundle ending, and the relay lens is a microlens array aligned with the fiber bundle.

10. The optically-pumped lasing system of claim 1, wherein the relay lens includes a convex surface on the end of each fiber making up the fiber bundle.

11. The optically-pumped lasing system of claim 1, comprising a back mirror opposite to an end of the lasing medium through which the pump output beam enters, and a front mirror, for together forming an optical cavity with the back mirror, and wherein said front mirror output couples laser light from said cavity.

12. The optically-pumped lasing system of claim 2, wherein the lasing medium is a laser crystal and said fibers are bundled into a cross-sectional shape matching that of the $TEM_{oo}$ lasing mode within the laser crystal, and wherein the pumping light excites said $TEM_{oo}$ mode so the crystal lases in a single transverse mode.

13. The optically-pumped lasing system of claim 4, further comprising a nonlinear optical means included within the laser cavity for converting fundamental laser output to a converted wavelength.

14. The optically-pumped lasing system of claim 4, wherein the front and back mirrors provide feedback at more than one lasing wavelength of the laser crystal, so as to allow simultaneous oscillation of more than one wavelength.

15. The optically-pumped lasing system of claim 5, further comprising a nonlinear optical crystal for frequency converting radiation from the lasing medium to produce a pulsed frequency-converted output.

16. The optically pumped lasing system of claim 8, further comprising;

a second lasing medium placed along an optical axis with the lasing medium pumped by the divergent beamlets, and a second source of laser diode pumping radiation positioned to pump to an end of the second lasing medium opposite the pumped end of the first lasing medium, a back mirror deposited directly onto the pumped end of the second lasing medium, and a front mirror which forms an optical cavity with the back mirror and output couples the laser light from the two lasing media out of the cavity.

17. The optically-pumped lasing system of claim 16, further comprising a rotator placed between the two lasing media for causing a 90-degree phase shift between laser beams passing through the two lasing media.

18. The optically-pumped lasing system of claim 16, further comprising a nonlinear optical crystal placed between the front mirror and the turning mirror for converting fundamental wavelength laser light to a converted wavelength, the front mirror being totally reflecting at the fundamental wavelength and at the converted wavelength for directing light of both wavelengths back into the laser cavity, and the turning mirror is transmissive at the converted wavelength.

19. The optically-pumped lasing system of claim 17, further comprising a polarizing element placed within the optical cavity to induce polarized output from the laser.

\* \* \* \* \*